(12) United States Patent
Meister et al.

(10) Patent No.: US 10,232,744 B2
(45) Date of Patent: Mar. 19, 2019

(54) INDEPENDENT TRANSLATING ROLLER SEAT

(71) Applicant: B/E AEROSPACE, INC., Wellington, FL (US)

(72) Inventors: Peter C. Meister, Miami, FL (US); Perci Oliveira, Doral, FL (US); John Iossifidis, Miami, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 57 days.

(21) Appl. No.: 15/405,035

(22) Filed: Jan. 12, 2017

(65) Prior Publication Data

US 2017/0313213 A1    Nov. 2, 2017

Related U.S. Application Data

(60) Provisional application No. 62/277,730, filed on Jan. 12, 2016.

(51) Int. Cl.
| | |
|---|---|
| *A47C 1/00* | (2006.01) |
| *B60N 2/22* | (2006.01) |
| *B64D 11/06* | (2006.01) |
| *B60N 2/838* | (2018.01) |

(52) U.S. Cl.
CPC .......... *B60N 2/2209* (2013.01); *B60N 2/838* (2018.02); *B64D 11/0641* (2014.12); *B64D 11/0642* (2014.12)

(58) Field of Classification Search
CPC ...... B60N 2/0722; B60N 2/07; B60N 2/0732; B60N 2/2209; B60N 2/838; A47C 17/045; A47C 17/04; A47C 19/02; A47C 20/08; B64D 11/0641; A61G 7/015
USPC ....... 297/342, 322, 340, 341, 313, 353, 325, 297/216.19, 216.15
See application file for complete search history.

(56) References Cited

U.S. PATENT DOCUMENTS

| | | | | |
|---|---|---|---|---|
| 2,500,744 | A * | 3/1950 | Beem ..................... | A61G 7/015 5/600 |
| 5,244,252 | A * | 9/1993 | Serber .................. | A47C 3/0255 297/216.19 |
| 6,106,065 | A * | 8/2000 | Carroll ................. | A47C 1/0347 297/325 |
| 6,565,112 | B2 * | 5/2003 | Hanson .................. | A61G 5/006 280/250.1 |
| 6,641,214 | B2 * | 11/2003 | Veneruso ............. | B60N 2/0232 297/216.15 |
| 7,780,230 | B2 * | 8/2010 | Serber .................. | B60N 2/0745 297/216.1 |
| 8,042,867 | B2 * | 10/2011 | Meister ................ | B64D 11/064 297/216.15 |

(Continued)

*Primary Examiner* — Chi Q Nguyen
(74) *Attorney, Agent, or Firm* — Angel N. Gerdzhikov; Donna P. Suchy; Daniel M. Barbieri

(57) ABSTRACT

A passenger seat is configured to adjust between an upright seating position and a lie-flat sleeping position, which includes one or more intermediate reclined seating positions, via independent rollers attached to the seat pan, or seat bottom, and to the backrest. As the passenger seat transitions between the upright seating position and the lie-flat sleeping position, guide channels set into the left and right frame rails direct the movement of the independent rollers through the guide channels and thereby control the angles of the seat pan and the backrest throughout the transition.

6 Claims, 7 Drawing Sheets

(56) References Cited

U.S. PATENT DOCUMENTS

| | | | | |
|---|---|---|---|---|
| 8,783,771 B2* | 7/2014 | Oleson | ................... | B64D 11/06 |
| | | | | 297/216.15 |
| 8,801,101 B2* | 8/2014 | Dagcioglu | ........... | B60N 2/3011 |
| | | | | 296/65.09 |
| 9,399,415 B2* | 7/2016 | Serber | .................. | B60N 2/0745 |
| 2006/0242634 A1* | 10/2006 | Fleischer | ............ | G06F 9/44521 |
| | | | | 717/148 |
| 2013/0221719 A1* | 8/2013 | Costaglia | ........... | A47C 1/03294 |
| | | | | 297/340 |
| 2014/0265497 A1* | 9/2014 | Hough | ..................... | A61G 5/14 |
| | | | | 297/316 |
| 2015/0201758 A1* | 7/2015 | Serber | ................... | A47C 3/0257 |
| | | | | 297/300.6 |
| 2018/0103768 A1* | 4/2018 | Nava | ...................... | A47C 17/04 |

* cited by examiner

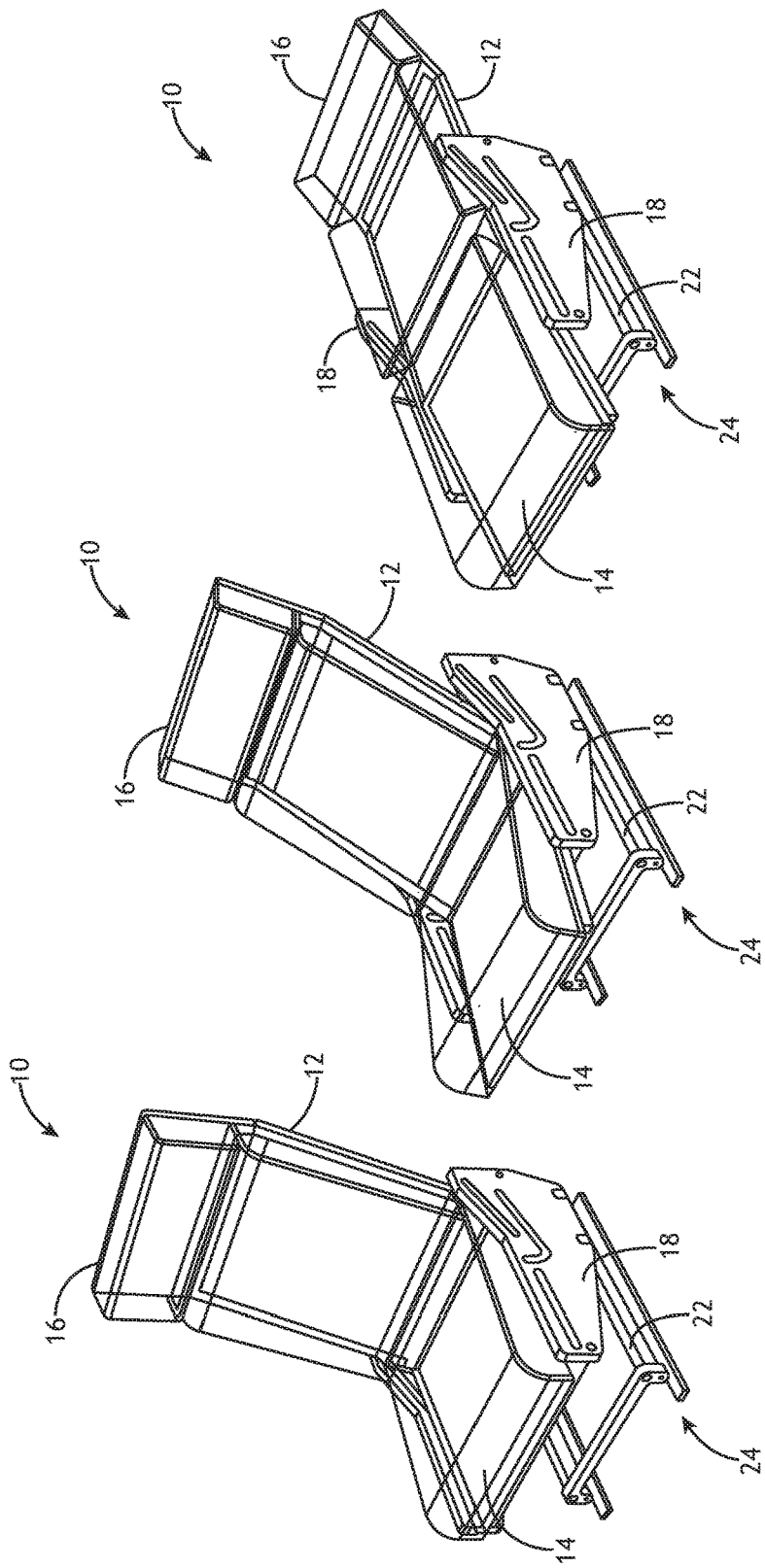

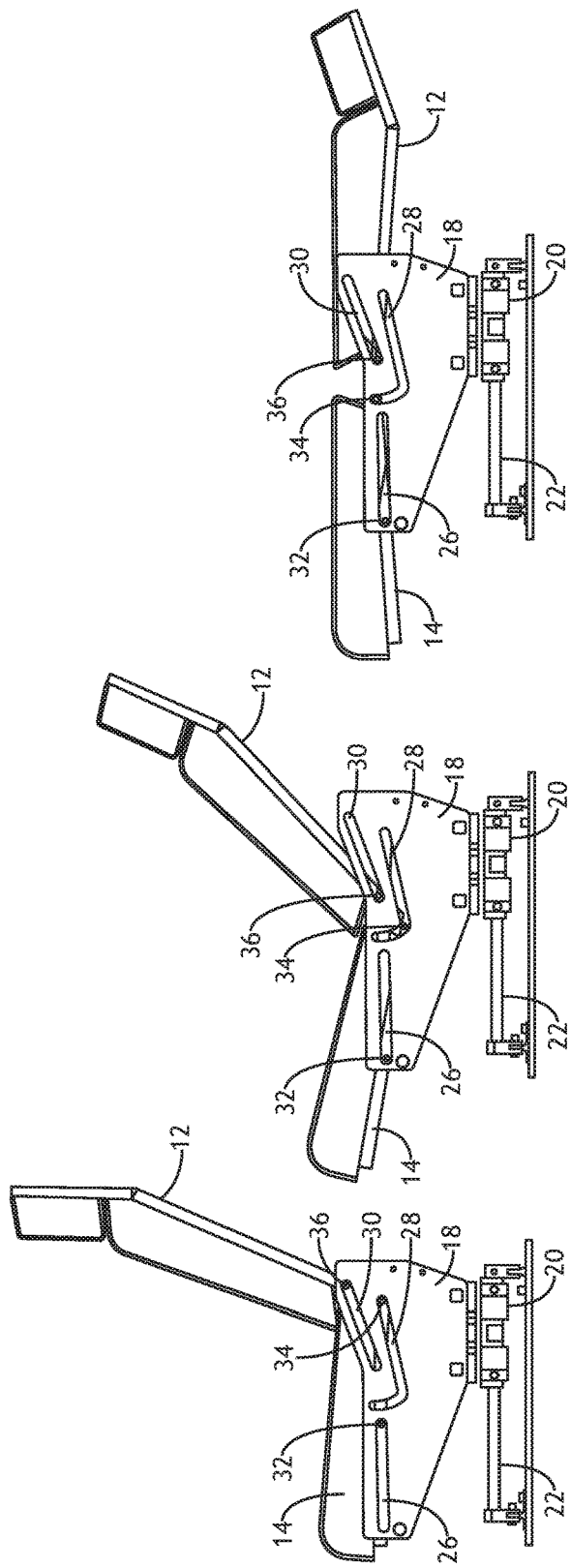

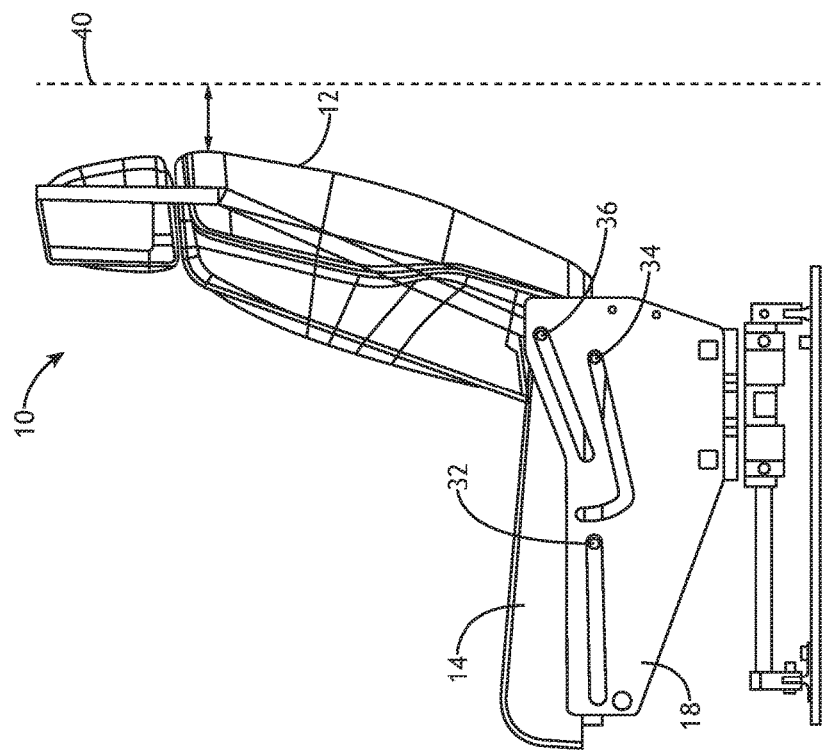

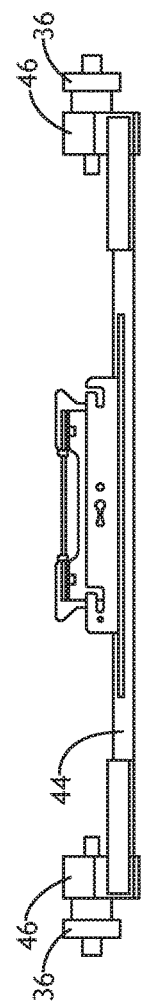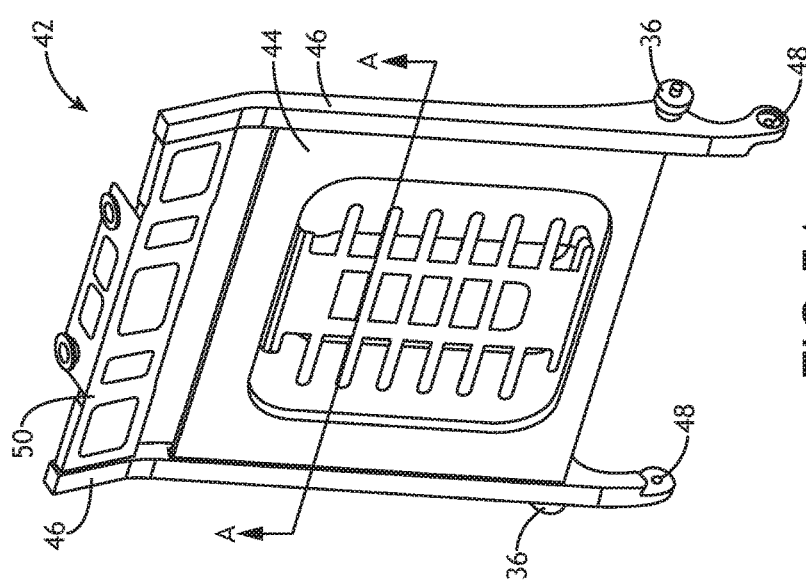
FIG. 5B
FIG. 5A

INDEPENDENT TRANSLATING ROLLER SEAT

RELATED APPLICATIONS

This application is related to and claims priority from U.S. Provisional Patent Application No. 62/277,730 entitled "Independent Translating Roller Seat" and filed Jan. 12, 2016, the contents of which are hereby incorporated by reference in its entirety.

TECHNICAL FIELD AND BACKGROUND OF THE INVENTION

The present invention relates generally to a passenger seat configured to adjust between an upright sitting position and a lie flat sleeping position, and more particularly, to an aircraft seat having independent rollers attached to the seat pan and backrest configured to travel along guides of fixed frame rails to control the angle of the seat an and backrest during recline.

Premium class passenger seats such as those found on airliners can be configured to adjust between an upright sitting position for taxi, take-off and landing (TTOL), and a lie flat sleeping position during flight. In the upright sitting position, the backrest is nearest vertical and the seat pan, or seat bottom, is at a shallow angle to horizontal. As the backrest reclines, the seat pan can be driven forward, and in some configurations, tilts farther from horizontal to cradle the passenger. In the lie flat sleeping position, the support surfaces of the seat pan, backrest and optional leg rest are generally coplanar, and can be horizontal.

Seat recline, seat pan angle and backrest angle are typically controlled by linkage arranged below the seat pan and/or behind the backrest. The seat pan and backrest rest can be pivotally attached such that seat pan movement drives backrest movement, or vice versa. In any conventional arrangement, under-seat and/or behind-seat linkage complicates the seat design and makes it difficult to customize the relationship between the seat pan angle and the backrest angle in the various sitting positions between upright and lie flat. Therefore, what is needed is a simplified way of supporting the seat pan and backrest while controlling the angles thereof during seat recline.

BRIEF DESCRIPTION OF THE DRAWINGS

Features, aspects and advantages of the present invention are better understood when the following detailed description of the invention is read with reference to the accompanying drawings, in which:

FIGS. 1A-1C are perspective views of a seat according to an embodiment of the invention shown in respective upright, reclined and lie-flat sitting positions;

FIGS. 2A-2C are side elevation views of the seat corresponding to FIGS. 1A-1C;

FIG. 4A is a side elevation view of the seat in the upright sitting position shown spaced from a bulkhead;

FIG. 5A is an isometric view of the backrest frame; and

FIG. 5B is a sectional view through the backrest frame taken along line A-A.

DETAILED DESCRIPTION OF THE INVENTION

Figure 3B:
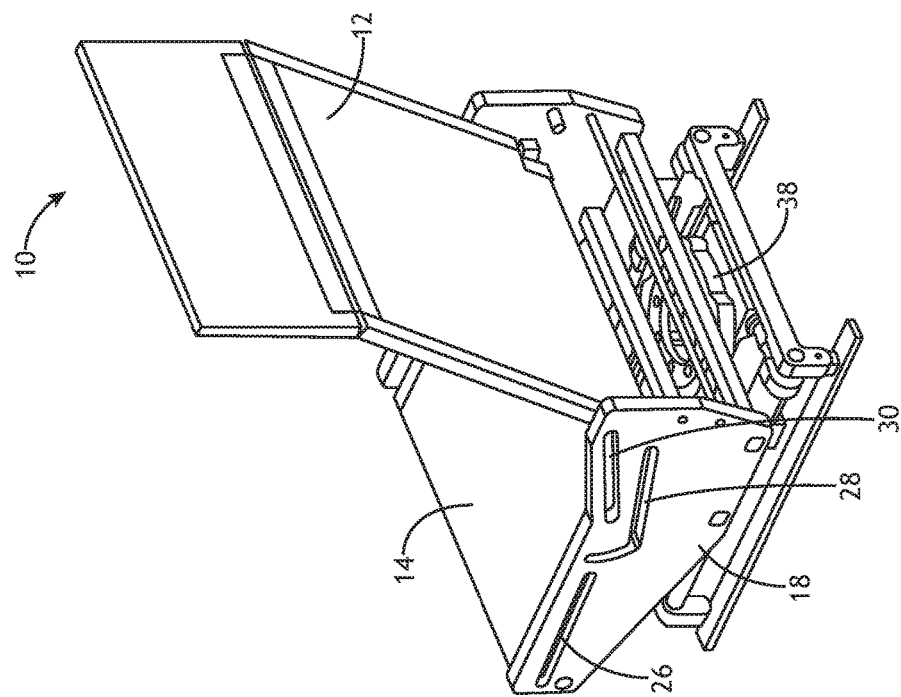
FIGS. 3A and 3B are respective front and rear perspective views of the seat.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

FIGS. 1A-1C illustrate respective upright, reclined and lie flat sitting positions of the passenger seat 10 according to a preferred embodiment of the invention. The lie flat sitting position is also referred to herein as the lie flat sleeping position. The upright sitting position shown in FIG. 1A is generally reserved for taxi, take-off and landing (TTOL), and in this particular sitting position the backrest 12 is nearest vertical and the seat pan 14 is at a shallow angle to horizontal. The reclined sitting position shown in FIG. 1B is generally reserved for in-flight use to enhance seating comfort, and in this particular sitting position the backrest 12 is closer to horizontal as compared to the upright sitting position, and the seat pan 14 tilted farther from horizontal as compared to the upright sitting position. The lie flat sleeping position shown in FIG. 1C is generally reserved for in-flight use to provide a comfortable sleeping position. In the sleeping position the support surfaces of the backrest 12 and the seat pan 14 are coplanar, and can be horizontal. Although not shown, the seat 10 can optionally include one or more of an adjustable leg rest, left arm rest and right arm rest, wherein any of the foregoing can be raised, lowered, pivoted, etc., to change the vertical height and/or angle thereof. It is envisioned and intended that the seat 10 not be limited to achieving only the three sitting positions shown in FIGS. 1A-1C, but is selectively adjustable to achieve any sitting position between the full upright and full lie flat sitting positions.

Seat 10 as shown includes a headrest 16 that may or may not be adjustable in height and/or angle relative to the backrest 12. In the lie flat sleeping position shown in FIG. 1C, the headrest 16 is oriented at a slight angle to the backrest 12 and at a shallow angle to horizontal.

The backrest 12 and seat pan 14 are supported on the left and right sides thereof by respective spaced left and right frame rails 18. Each frame rail 18 can be vertically oriented and the frame rails can be arranged parallel to one another. Each frame rail 18 can be attached to the seat frame, seat base or other supportive seat member. Each frame rail 18 can be attached to a carriage 20 (see FIGS. 2A-2C), which may be configured to translate along fixed frame members, such as horizontally-oriented tubes 22. In this arrangement, the frame rails 18, backrest 12, seat pan 14 and optional leg and arm rests can be moved together as a single unit in the "forward" and "rearward" directions relative to an underlying seat frame 24 secured to the deck. The seat frame 24 can include, but is not limited to, transverse beams, legs, track fasteners, etc.

FIGS. 2A-2C show the respective upright, reclined and lie flat sitting positions of the seat 10, and particularly, a face of the frame rails 18. Each frame rail 18 as shown has three guide channels including a first guide channel 26, a second guide channel 28, and a third guide channel 30. Rollers rotatably carried on opposing sides of the backrest 12 and seat pan 14 include a first seat pan roller 32, a second seat pan roller 34, and a backrest roller 36.

The first guide channel 26 is arranged and shaped to guide the first vertically-oriented seat pan roller 32 disposed about mid-span along the length of the seat pan 14. The second guide channel 28 is arranged and shaped to guide the second vertically-oriented seat pan roller 34 disposed near the rearward end of the seat pan 14. The third guide channel is arranged and shaped to guide the vertically-oriented backrest roller 34 disposed at or near the pivotal connection between the rearward end of the seat pan 14 and the bottom end of the backrest 12.

The first guide channel 26 is an elongate linear slot that extends generally horizontally from about the forward end of the frame rail 18 to about mid-span the length of the frame rail. The second guide channel 28 includes an elongate linear portion oriented at a shallow angle to horizontal which transitions at the forward end thereof into a short arcuate leg. The second guide channel extends from near the rearward end of the frame rail 18 to about mid-span thereof. The third guide channel 30 is an elongate linear slot oriented at a shallow angle to horizontal, and as shown, at a slightly steeper angle to horizontal as compared to the angle of the second guide channel 28. The third guide channel 30 is arranged vertically above the linear portion of the second guide channel 28. In this arrangement, the three guide channels 26, 28, 30 guide the respective three rollers 32, 34, 36 to control the angle of the backrest 12 and seat pan 14 as the seat moves between upright and lie flat.

In the upright sitting position shown in FIG. 2A, the three rollers 32, 34, 36 are disposed at the rearwardmost ends of the three guide channels 26, 28, 30. The rearwardmost end of the second guide channel 28 can be positioned slightly vertically lower than the rearwardmost end of the first guide channel 26 such that the seat pan is tiled in the rearward direction slightly to horizontal. The third roller 36 at or near the pivotal connection of the backrest 12 and seat pan 14 is at the rearward end of the third guide channel 30, which is arranged vertically higher than the first and second guide channels 26, 28 such that the backrest 12 is driven upwards as the backrest is moved to upright.

In the reclined sitting position shown in FIG. 2B, the first and third rollers 32, 36 travel to the forwardmost end of their respective guide channels 26, 30, while the second roller 34 travels to the transition point between the elongate linear portion and the arcuate portion of the second guide channel 28. The movement of the first, second and third rollers 32, 34, 36 within their respective first, second and third guide channels 26, 28, 30 between the upright and reclined sitting positions is linear and drives the seat pan 14 and backrest 12 forward, and the angular arrangement of the second and third guide channels 28, 30 relative to each other and to the first guide channel 26 are such that the pivotal connection of the backrest 12 to the seat pan 14 is driven forward and downward, thus opening the angle between the backrest 12 and the seat pan 14 and increasing the tilt of the seat pan 14.

During the transition from the reclined sitting position shown in FIG. 2B to the lie flat sleeping position shown in 2C, the first and third rollers 32, 36 remain disposed at the forwardmost ends of their respective guide channels, while the second roller 34 is driven upward along the arcuate portion of the second guide channel 28. Movement of the second roller 34 upward along the second guide channel 28 further opens the angle between the backrest 12 and the seat pan 14, thus tilting both the backrest 12 and the seat pan 14 to horizontal or near horizontal such that the two support surfaces are coplanar.

The three "attachment points" between the backrest 12/seat pan 14 and the frame rails 18, and the pivotal attachment of the backrest 12 to the seat pan 14, collectively stabilize and support the backrest and seat pan throughout their respective range of movement. The pivotal attachment of the backrest 12 to the seat pan 14 allows one component to be driven by the other, such as by way of a linear actuator disposed beneath the seat pan 14 or behind the backrest 12.

Figure 3A:
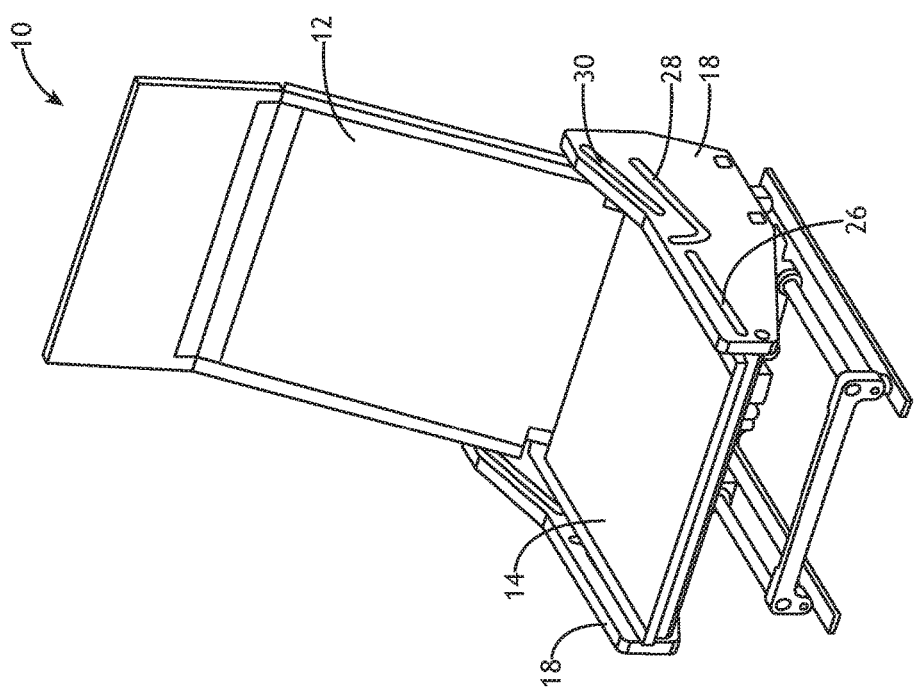

FIG. 3A shows further details of the seat 10 and frame rails 18, while FIG. 3B shows an optional swivel assembly 38 located beneath the seat pan 14 which allows the seat to spin.

Figure 4B:
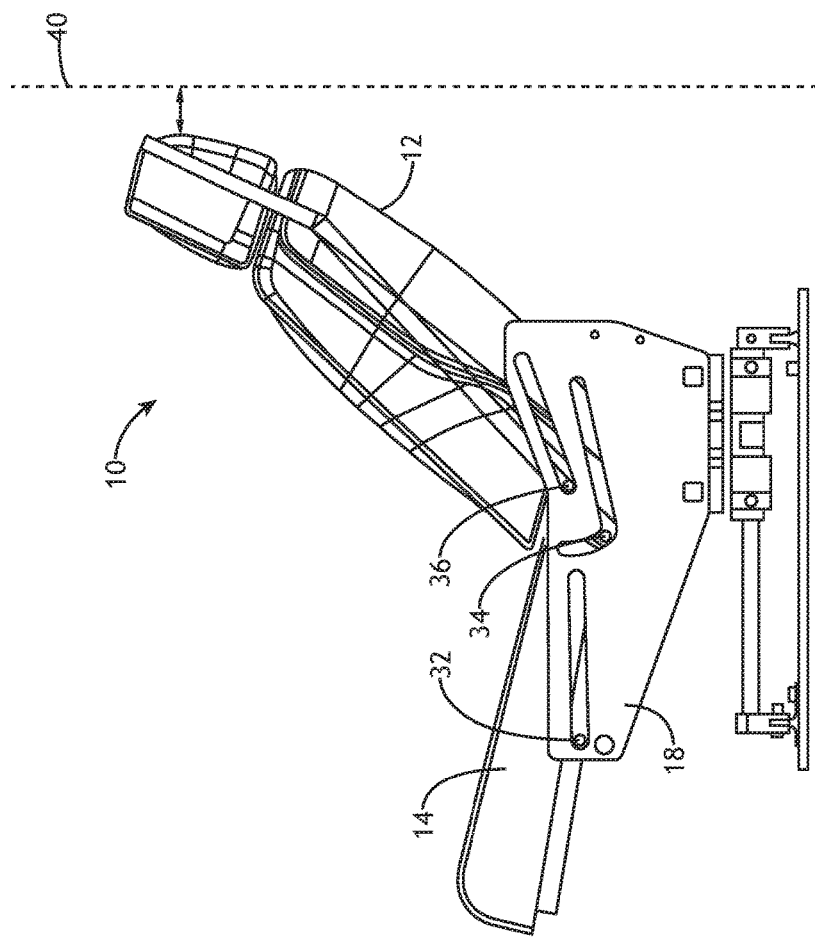
FIG. 4B is a side elevation view of the seat in the reclined sitting position shown spaced from the bulkhead.
Figure 4C:
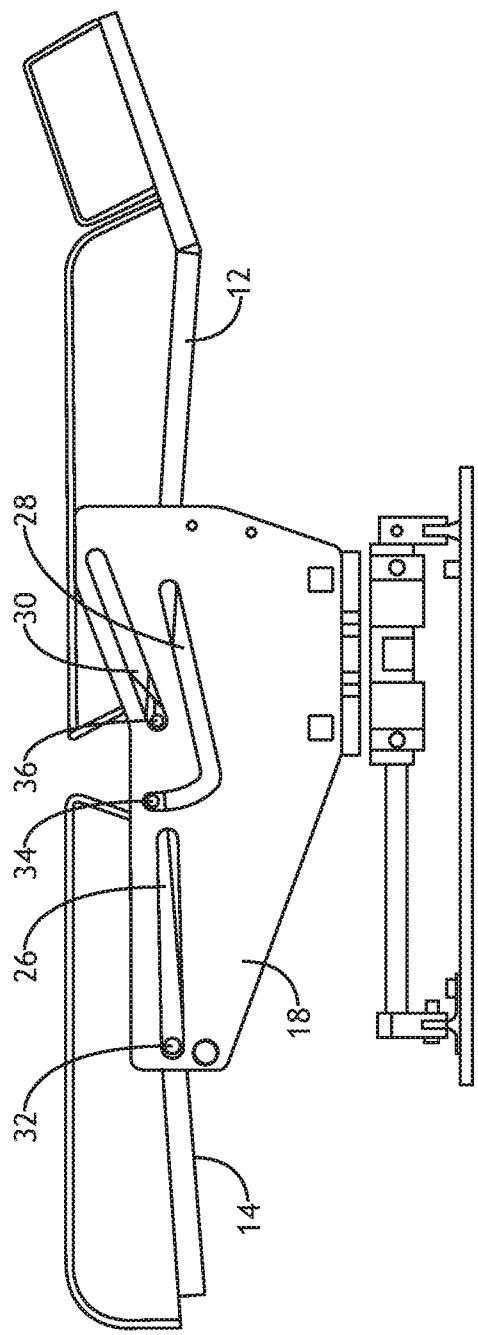
FIG. 4C is a side elevation view of the seat in the lie flat sleeping position.

FIG. 4A shows the seat 10 in the upright sitting position and with the backrest 12 spaced relative to a wall, partition, bulkhead, monument, etc., shown generally at reference numeral 40. Comparing FIGS. 4A and 4B, it can be seen that the distance between the backrest 12 and the wall 40 at the deepest point of the backrest in the upright sitting position moves closer to the wall as the seat moves from upright to reclined. To allow the backrest 12 to move from reclined to lie flat as shown in FIG. 4C, the carriage 20 can serve to translate forward the entire backrest 12, seat pan 14 and frame rail 18 assembly.

FIG. 5A shows one embodiment of a backrest frame 42 generally including a main panel 44 arranged between left and right spaced U-channels 46. Pivotal attachment points 48 are provided at one end of each U-channel and the backrest rollers 36 can be spaced slightly therefrom. As discussed above, the rollers 36 and the pivotal attachment points 48 to the seat pan can be collocated. The backrest frame 42 may further include a headrest panel 50 spaced from and at an angle to the main panel 44. FIG. 5B is a sectional view through the backrest frame 42.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. An adjustable passenger seat, comprising:
   a seat pan;
   a backrest pivotally attached to the seat pan;
   rollers rotatably carried on opposite sides of the seat pan and the backrest; and
   frame rails arranged on left and right sides of the seat pan and backrest, each of the frame rails having guide channels along which the rollers travel to adjust seat pan and backrest angles as the adjustable passenger seat moves between an upright sitting position and a lie flat sleeping position.

2. An adjustable passenger seat, comprising:
   a seat pan associated with a left side and a right side;
   a backrest pivotally attached to the seat pan at a variable angle;
   a plurality of rollers rotatably coupled to both the seat pan and the backrest, each roller associated with one or more of the left side and the right side; and
   frame rails including at least a left frame rail associated with the left side and a right frame rail associated with the right side, each frame rail having one or more guide channels, each guide channel configured to accommodate at least one roller of the plurality of rollers, the at least one roller configured to adjust the variable angle as the seat pan and the backrest move between a first orientation associated with an upright sitting position and a second orientation associated with a lie flat sleeping position by traveling through the accommodating guide channel.

3. The adjustable passenger seat of claim 2, wherein the first orientation is associated with at least one first position of the at least one roller within the accommodating guide channel, and the second orientation is associated with at least one second position of the at least one roller within the accommodating guide channel.

4. The adjustable passenger seat of claim 2, further comprising:
   at least one headrest pivotably coupled to the backrest.

5. The adjustable passenger seat of claim 2, further comprising:
   at least one fixed frame member slidably coupled to at least one of the seat pan and the backrest by at least one carriage, the at least one carriage configured to translate the seat pan and the backrest relative to the at least one fixed frame member between a first position associated with the first orientation and a second position associated with the second orientation.

6. The adjustable passenger seat of claim 2, wherein the seat pan and the backrest are positionable in at least one intermediate orientation between the first orientation and the second orientation.

* * * * *